United States Patent [19]

Chan et al.

[11] Patent Number: 4,872,121
[45] Date of Patent: Oct. 3, 1989

[54] METHOD AND APPARATUS FOR MONITORING ELECTRONIC APPARATUS ACTIVITY

[75] Inventors: Ellery Y. Chan, Melbourne Beach; Thomas L. Sterling, Palm Bay, both of Fla.

[73] Assignee: Harris Corporation, Melbourne, Fla.

[21] Appl. No.: 82,478

[22] Filed: Aug. 7, 1987

[51] Int. Cl.$^4$ .............................................. G06F 11/00
[52] U.S. Cl. ................................. 364/551.01; 364/550
[58] Field of Search ............ 364/900, 550, 468, 551.01

[56] References Cited

U.S. PATENT DOCUMENTS

| | | | |
|---|---|---|---|
| 3,868,480 | 2/1975 | Murgio et al. | 179/8 A |
| 4,241,416 | 12/1980 | Traczy-Hornoch | 364/900 |
| 4,364,036 | 12/1982 | Shimizu | 340/715 |
| 4,389,706 | 6/1983 | Gomola et al. | 364/130 |
| 4,400,783 | 8/1983 | Locke, Jr. et al. | 364/483 |
| 4,510,572 | 4/1985 | Reece et al. | 364/489 |
| 4,541,063 | 9/1985 | Doljack | 364/550 |
| 4,636,967 | 1/1987 | Bhatt et al. | 364/550 |
| 4,695,965 | 9/1987 | Fujita et al. | 364/518 |
| 4,730,247 | 3/1988 | Takahara | 364/560 |

Primary Examiner—Parshotam S. Lall
Assistant Examiner—V. Trans
Attorney, Agent, or Firm—John L. DeAngelis, Jr.

[57] ABSTRACT

A system activity monitor for monitoring the performance of an electronic apparatus, e.g., a computer. The system activity monitor includes a plurality of data acquisition modules that are connected to the monitored system as desired. The actual connection is made via a customizing board that provides the necessary flexibility so that the system activity monitor can be connected at any desired location of the monitored computer system. An event board of the system activity monitor detects the occurrence of predetermined events. An event occurs when a predetermined sequence of signals occurs within the monitored system; the sequence is determined by the user. When an event is detected an accumulator board of the system activity monitor accumulates performance data of the monitored system.

15 Claims, 6 Drawing Sheets

METHOD AND APPARATUS FOR MONITORING ELECTRONIC APPARATUS ACTIVITY

FIELD OF THE INVENTION

This invention relates to a method and apparatus for observing the behavior of an electronic apparatus, especially the behavior of predetermined signals between user-identified events.

BACKGROUND OF THE INVENTION

As is well known in the art, a logic analyzer is a device for monitoring the logic state of various signals input thereto. The logic analyzer can be configured to continuously monitor logic states or to monitor one or more logic states after a triggering event occurs. The logic state information can be recorded or displayed to provide the operator with sufficient information to analyze and detect errors in the monitored logic signals. Although suitable for monitoring relatively simple logic circuitry, a logic analyzer is incapable of adequately monitoring the many logic circuits associated with complex electronic apparatus, for example, a computer system.

SUMMARY OF THE INVENTION

To completely monitor the logic circuits of a computer system, especially one having a multiprocessor architecture, it is desirable to use a complex set of trigger signals, wherein the occurrence of predetermined trigger signals activates the monitoring and/or collection of predetermined logic information. Further, it is desirable to use a sequence of both current triggering signals and historical signals. These advantageous features are beyond the capabilities of state-of-the art logic analyzers. It is also desirable to observe logic circuit activity in real-time and to accumulate the logic state information for later analysis.

The system activity monitor of the present invention offers the capability of nonintrusively monitoring a plurality of hardware events based on predetermined triggering events in any electronic apparatus. Preferentially, it is ideally suited for monitoring hardware activity of a computer system. The system activity monitor comprises a number of data acquisition modules attached as slaves to a computer system to be monitored. In one embodiment this computer system has a multiprocessor architecture and the system activity monitor can be connected to the bus that connects the processors of the multi-processor system. Each data acquisition module includes two elements: an event sequencer that allows data collection to be controlled by predetermined patterns of monitored signals (i.e., trigger signals), and an accumulator array that collects the data. Once these predetermined patterns are set-up, each data acquisition module operates autonomously to collect the desired data. A customizing board provides the physical connection between the data acquisition module and the monitored system, as well as providing special mapping functions, such as address decoding. The customizing board is necessary to adapt the system activity monitor to a variety of data collection schemes and physical hardware types. The system activity monitor also includes an interactive display that can provide a pseudo-real-time image of system activity. The interactive display is driven by a controller that receives data from the data acquisition modules.

The system activity monitor of the present invention is an extremely flexible tool that is adaptable to a wide variety of experimental computer monitoring needs. Observation of both very short duration and very long duration events is accomplished in a purely nonintrusive manner; there will be no effect on or alteration of system performance. This is important because any observation that affects system activity alters the results, for example, by causing changes in bus contention patterns that are under observation. The system activity monitor achieves flexibility by using a reconfigurable event sequencer to delineate predetermined triggering events, and also by implementing special functions on the customizing board. To attain a nonintrusive observation, the system activity monitor uses its own bus, rather than the bus of the system under observation.

BRIEF DESCRIPTION OF THE DRAWINGS

The present invention may be better understood, and the further advantages and uses thereof more readily apparent, when considered in view of the following detailed description of exemplary embodiments, taken with the accompanying drawings in which.

DESCRIPTION OF THE PREFERRED EMBODIMENTS

Figure 1:
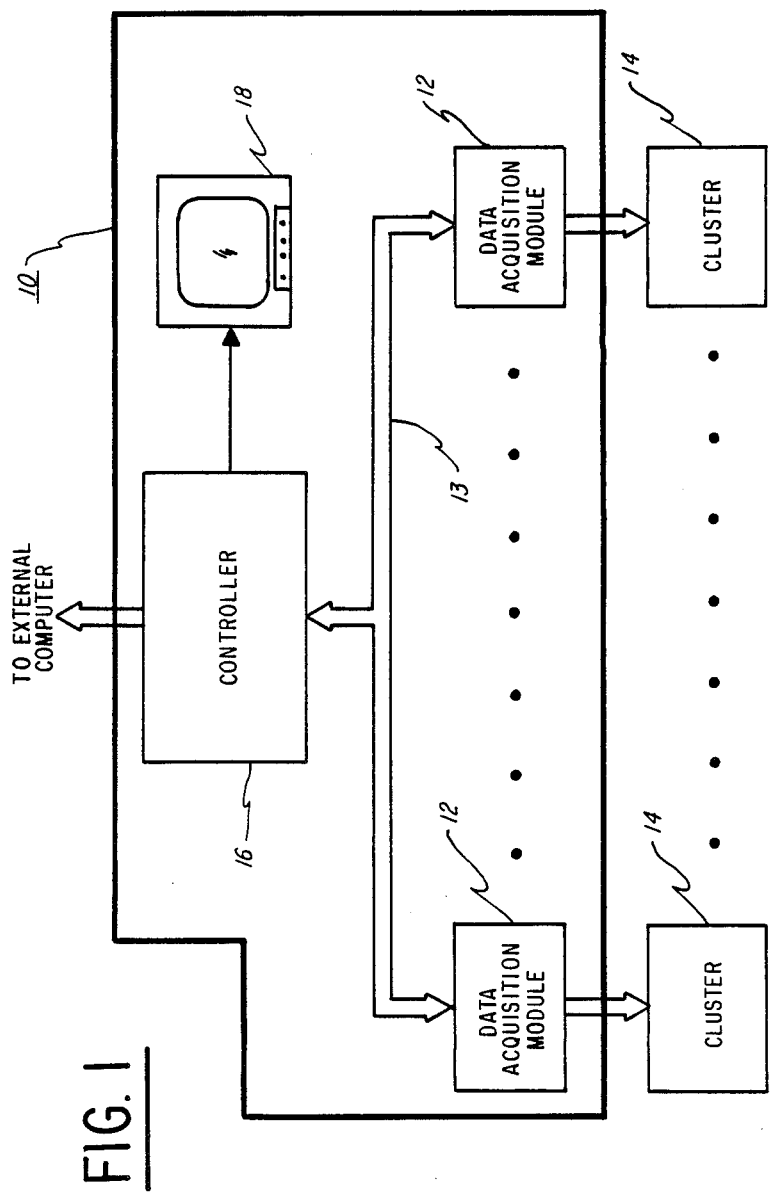
FIG. 1 is a block diagram of a system activity monitor constructed according to the teachings of the present invention.

The system activity monitor 10 shown in block diagram form in FIG. 1 is a performance monitoring system that observes and records the real-time behavior of a computer system. In the preferred embodiment, this computer system is a multiprocessor parallel architecture system comprising a plurality of clusters 14. The system activity monitor 10 can aid researchers in evaluating a parallel architecture system, but to do this accurately must not affect system performance during the period of observation. The system activity monitor 10 can also be customized and can provide observation of both very short duration (in one embodiment 100 nanoseconds) and very long duration events associated with the monitored system.

Further, to obtain meaningful results the sampling rate of the system activity monitor 10 must be sufficiently high so that the data acquisition hardware can record short duration events, such as bus transactions. Each data acquisition module of the system activity monitor 10 is an autonomous device that can monitor some portion of the multiprocessor system and is reconfigurable under software control to perform different data collection functions. Each data acquisition module is also manually reconfigurable to change hardware functions needed for special data acquisition tasks.

As can be seen from FIG. 1, the system activity monitor 10 includes a plurality of data acquisition modules, shown generally with reference character 12, attached as slaves to a bus 13. Although FIG. 1 shows a standard computer data bus, the bus 13 can also represent other types of communications media, such as a local area network. The data acquisition modules accumulate data for transmission over the bus 13, under control of a controller 16. In the embodiment of FIG. 1, each data acquisition module 12 interfaces with a cluster 14 of a multiprocessor system. Each cluster 14 can include multiple microprocessors arranged in a parallel system configuration with the microprocessors in the other clusters. Data collected by the data acquisition modules 12 can be displayed on a display 18 under control of the controller 16.

Figure 2:
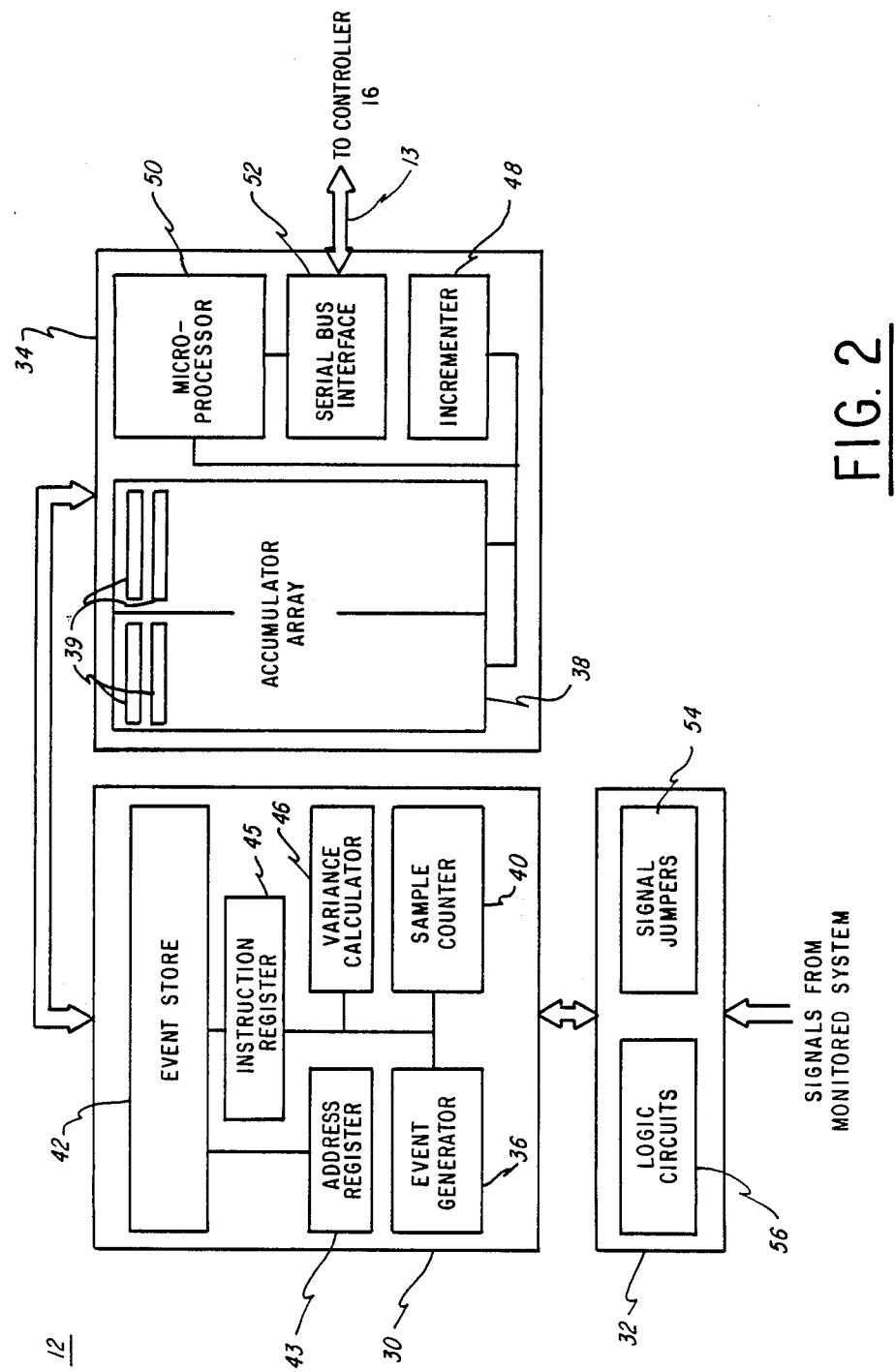
FIG. 2 is a block diagram of the data acquisition model of the system activity monitor in FIG. 1.

Each data acquisition module 12 has three major components as illustrated in FIG. 2: an event network 30, a customizing network 32, and an accumulator network 34. The event network 30 includes an event generator 36 that controls data collection via a predetermined sequence of trigger signals. The accumulator network 34 includes an accumulator array 38 that collects the desired data, for example, the number of occurrences of a particular state between events. The customizing network 32 gives the system activity monitor 10 flexibility to perform a variety of experiments and also enough flexibility to allow the same data acquisition modules to monitor various types of system buses or other internal processor signals (e.g., non-bus signals). Thus the system activity monitor 10 has general purpose utility for monitoring electrical signals in any apparatus, with the monitoring controlled by the occurrence of predetermined present or past triggering signals. In operation, each data acquisition module 12 observes events, tallies the events, and sends the accumulated results to the display 18 via the controller 16. The FIG. 1 embodiment shows the data acquisition modules 12 connected to clusters 14. Preferably, the data acquisition modules 12 would be connected to the bus within each cluster 14 because the majority of interesting signals to monitor travel along the internal cluster bus.

An event is defined as a particular combination of current state signals, signal transitions, and/or previous event occurrences in the monitored system. The sequence of conditions that determine an event are selected by the experimenter. The system activity monitor 10 can monitor and record the occurrence of a wide variety of events, some of which will have a very short duration and others a very long duration. Event detection is performed by the event generator 36, under control of a program in the event store 42, and when the conditions for an event have been satisfied, an event signal is generated within the event network 30. Events are tabulated by a sample counter 40, and the entire event generation and tabulation mechanism is controlled by a program in the event store 42.

The event store 42 is a writable control store containing user-supplied microinstructions for controlling the generation of the event signals. In one embodiment the event store 42 is constructed of 64×9 bit static RAMs, and can store sixty-four 63-bit words. Each microinstruction word configures the data acquisition modules 12 to detect a specific event. Each event causes the accumulation of different data signals. Up to sixty-four different events can be detected by the event board 30. The contents of an address register 43 designate the address of a microinstruction in the event store 42. This microinstruction is loaded into an instruction register 45 and configures the event generator 36 to observe one of sixteen (in one embodiment) possible signals through the customizing network 32. The event generator 36 also produces the event signal after n rising or n falling edges of the selected signal. The selected signal, the value of n, and the direction of the transition are determined beforehand by the experimenter, and included in the microinstruction, which is stored in the event store 42. This next-event information will increment the contents of the address register 43 or load the address register 43 with a value from the current microinstruction, so that it then contains the address of the next microinstruction to use for event detection. Again, using the contents of the address register 43 as an address, the next microinstruction is located in the event store 42 and loaded into the instruction register 45. After every event the address register 43 is either incremented or loaded with a value from the current microinstruction.

The decision to increment or load a new value is based on the state of one signal of a second group of sixteen signals when the event occurs. Again, this selection of a signal from the second group of sixteen signals is made by the experimenter and stored in the event store 42, in the form of a microinstruction. Thus, in this way the experimenter determines the sequence of observed signals that will generate sequential event signals.

In the sample counter 40, a signal from a third group of sixteen signals is modified by a divide-by-m circuit. The resulting clock-like pulses increment the contents of the sample counter 40. The contents of the sample counter 40 serve as an address register for the accumulator array 38, i.e., the contents of the sample counter 40 identify one of the counters 39 in the accumulator array 38. Incrementing the sample counter 40 is inhibited by the occurrence of one predetermined signal from a fourth group of sixteen signals. Thus, when a clock-like pulse occurs simultaneous with the predetermined signal from the fourth group of sixteen signals the sample counter 40 is incremented. If the predetermined signal is absent when the clock-like pulse occurs, the sample counter 40 is not incremented. Note that it is only in a preferred embodiment that the first, second, third, and fourth groups of signals have sixteen signals in each group. Further, the four groups of signals do not have to represent independent signal groups; there can be common signals between and among the four signal groups.

The accumulator network 34 collects the monitored data and periodically transmits the data back to the controller 16. In one embodiment, the accumulator array 38 (in the accumulator network 34) includes 4096 counters for collecting data. Representational counters are designated by reference character 39 in FIG. 2. Because an experiment may have a long duration and the experimenter may need real-time feedback, the accumulator array 38 may be duplicated such that the data in each half is periodically swapped by the microprocessor 50 in a double-buffered or "ping pong" fashion. Thus the microprocessor 50 has access to one-half of the accumulator array 38 while the incrementing hardware has access to the other half. The system activity monitor 10 operates primarily in one of three modes; in each mode each counter 39 accumulates specified observational data from the monitored system, as will be discussed further herein below.

The controller 16 coordinates the slave end of the interface to the external computer (via a serial-bus interface 52) when necessary. The microprocessor 50 loads the experiment configuration into the event store 42 via the serial bus interface 52. The microprocessor 50 also swaps the accumulator array halves 38, retrieves the accumulated data therefrom for input to the serial bus interface 52, and reinitializes each counter 39. The microprocessor 50 has access to the event store 42, the sample counter 40, the incrementer 48, and the accumulator array 38 for hardware verification between experiments.

The customizing network 32 is connected between the event network 30 and connectors of the target or monitored system. The customizing network 32 routes signals from the target system through a jumper network to the proper inputs of the event network 30. Signals can also be tapped to drive special logic functions such as address decoding, that may be required for some experiments. The customizing network 32 provides the system activity monitor 10 with adaptability to a large variety of data collection situations and apparatus.

Signal jumpers 54 of the customizing network 32 allow the experimenter to choose a set of relevant signals from the monitored system and route these signals to the event network 30. Logic circuits 56 provide hardware logic circuits for implementing experiment-dependent hardware functions. For example, it may be necessary in one experiment to combine several signals in a logical AND function and provide the resultant signal to the event network 30. Also, address decoding can be performed within the logic circuits 56 if it is necessary to collect statistics on memory accessing patterns of the target system.

As discussed above, the system activity monitor 10 can be connected to a parallel multiprocessor architecture system by having a data acquisition module 12 connected to each cluster as illustrated in FIG. 1. Further, a data acquisition module 12 can also be connected to the global shared memory of such a multiprocessor system. In this latter embodiment the system activity monitor 10 can collect data related to several aspects of the multiprocessor system, for example: the bus cycle distribution (i.e., the read/write ratio), contention for bus access, contention for access to the global memory, patterns of access (e.g., local reads versus global reads), the mix of reads, writes, fetches, and refresh cycles, the semaphore hit/miss ratio, and the distribution of bus access interarrival times.

Each data acquisition module 12 can be configured by loading the event store 42 with a data collection sequence to perform the data acquisition function in one of the three modes described below. When configured in the logic analyzer mode the data acquisition module 12 is capable of performing like a logic analyzer. One of the 4096 counters 39 in the accumulator array 38 can store the state of sixteen signals at one instant in time. The steps required in this mode are as follows: (1) attach the sixteen parallel inputs to the customizing network 32 at points to be observed in the monitored system; (2) select the proper sampling signal (i.e., sampling rate) (for instance a bus clock or internal time-base signal; this is a signal from among the third group of signals discussed above; a fourth group of signals can also be used to inhibit sampling); (3) zero the accumulator address register (i.e, zero the contents of the sample counter 40); (4) at each rising (or falling) edge of the sampling signal, generate an event signal, which stores the values of the sixteen parallel input signals in the one counter 39 that is identified by the contents of the sample counter 40 (the first sixteen values will be stored in counter zero of the counters 39, the next sixteen values will be stored in counter one of the counters 39, etc.); (5) modify (e.g., increment) the accumulator address register, i.e., the contents of the sample counter 40, so that each successive group of sixteen signals is stored in different or successive memory locations of the accumulator array 38. By selecting the proper time base to modify or increment the accumulator address between samples, data can be captured and reconstructed into digital waveforms for display.

Figure 3:
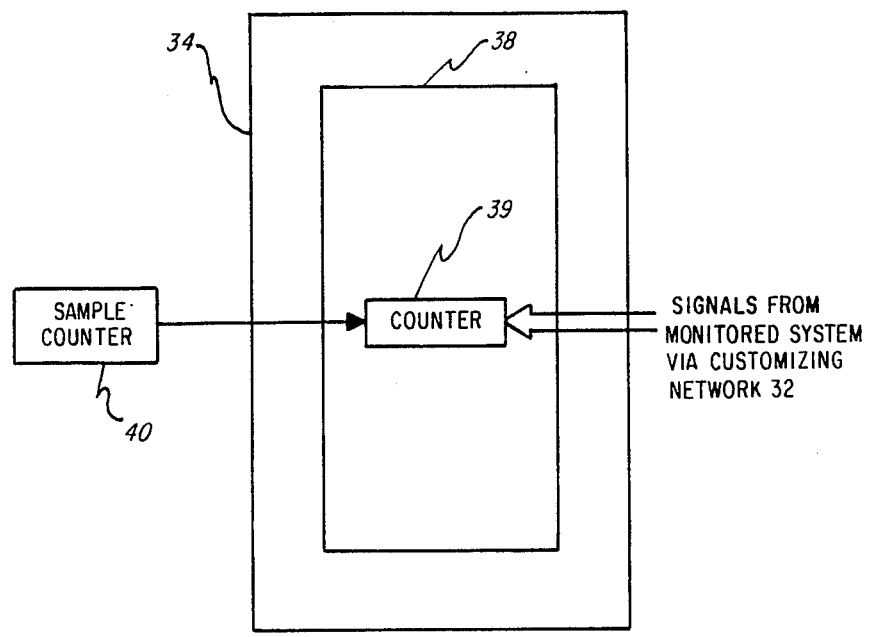
FIGS. 3, 4, and 5 are simplified block diagrams illustrating operation of the system activity monitor in three operational modes.

FIG. 3 is a simplified diagram of the operation of the system activity monitor 10 in the logic analyzer mode. The contents of the sample counter 40 identify a counter 39 within the accumulator array 38. At each rising (or falling) edge of the sampling signal the value of a plurality of signals from the monitored system (sixteen signals in the preferred embodiment) are stored in the identified counter 39. The sampling signal is one of the third group of signals discussed above. When the next sampling signal occurs, the contents of the sample counter 40 is incremented so that the next group of signals from the monitored system is stored in the next counter 39.

In the profile mode the system activity monitor 10 uses twelve parallel inputs ($2^{12}=4096$) of the data acquisition module 12 to select one of 4096 counters 39; the selected counter 39 is successively modified or incremented by the contents of the incrementer 48. The modification occurs when the event detection mechanism discussed above sees the proper current or past states and generates an event signal. This mode is useful for recording the distribution of states that are identifiable by unique combinations of up to twelve parallel inputs at the time of an event. An example of a situation where this type of data collection is useful is in tallying the number of times each processor of a parallel multiprocessor system uses the parallel system bus. The twelve parallel inputs would identify the master processor and would select a corresponding accumulator location (i.e., one of the counters 39) to be modified. The event signal is generated each time a new master takes over the bus and would also cause the contents of the last selected counter 39 to be incremented. When a new processor takes over the bus a new address is generated using the twelve parallel inputs, and when this processor has completed its activity on the bus, the associated counter 39 would be incremented.

Figure 4:
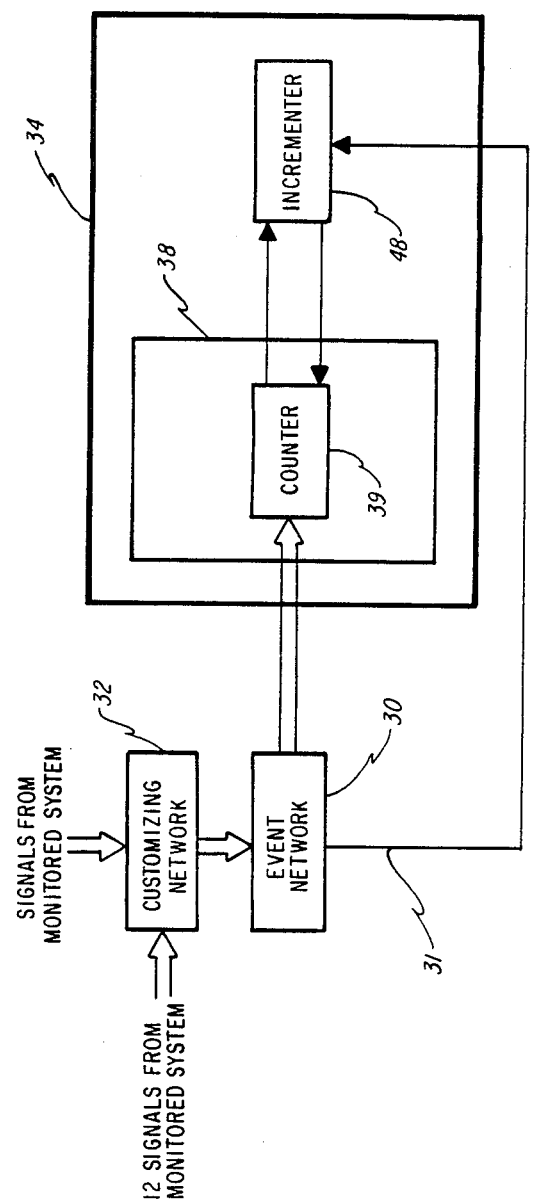

A simplified diagram of the operation of the system activity monitor 10 in the profile mode is illustrated in FIG. 4. Signals shown entering the customizing network 32 vertically from above represent the first group of signals discussed above. This first group of signals is input to the event network 30 for determining the occurrence of an event. When an event is detected, an appropriate signal is placed on the signal line 31, which is connected between the event network 30 and the incrementer 48. Twelve signals are also shown in FIG. 4 as entering the customizing board 32 from the left. These twelve signals from the monitored system select one of the 4096 counters 39 in the accumulator array 38. The incrementer 48 modifies (in one embodiment increments) the contents of the identified counter 39 when an event occurs.

The third data collection mode is the histogram mode, which like the profile mode, uses the capability of the data acquisition module 12 to identify events based on past event sequences and the current state of inputs from the monitored system. In this mode, the accumulator address is initially set to zero (i.e., the contents of the sample counter 40 is zero) and the occurrence of a signal from the third and fourth group of signals increment or inhibit (as discussed above) the accumulator address. When an event is detected, the event signal is generated and the contents of the counter 39 currently pointed to by the contents of the sample counter 40 is incremented. Following this, the sample counter 40 is reset to zero and the process repeats. The result is the construction of a distribution or histogram of events within the counters 39. For example, to generate a histogram of bus use for an identified processor the contents of the sample counter 40 is incremented each clock cycle (i.e., the clock signal would represent the signal from the third group of signals and there would not be a fourth group of signals because it is not desired to inhibit incrementing of the sample counter 40 during any clock cycles). The event signal is generated at the end of each processor's transaction on the bus. Thus the contents of counter zero of the counters 39 represents the number of bus transactions occupying less than one clock cycle. That is, if the first event signal occurs before the first clock pulse the sample counter 40 points to counter zero and the contents of the counter zero is incremented to one. Assume the next event signal occurs after four clock pulses. Now the event signal will increment the contents of the fourth counter, indicating that one transaction for this processor took four clock pulses. In histogram form, the height of the first bar (which is proportional to the contents of counter zero) represents the number of processor transactions lasting less than one bus clock cycle (the contents of counter zero), the height of the second bar (which is proportional to the contents of counter one) represents the number of processor transactions lasting less than two cycles (the contents of counter one), etc.

In the histogram mode it is also possible to take advantage of the increment and inhibit features associated with incrementing of the sample counter 40 as discussed above. In this embodiment the contents of the sample counter 40 are incremented on an a periodic basis and thus the contents of the counters 39 (and the histogram generated therefrom) are incremented on an a periodic basis. Further, it is possible to take advantage of the variable event-generating conditions (i.e., the first group of sixteen signals) to further tailor the data collection scheme in this mode.

In one histogram mode embodiment, the data acquisition module 12 supports better than one-hundred nanosecond resolution, and therefore the incrementer 48 must be able to increment the counter zero of the counters 39 at least every 100 nanoseconds, counter one of the counters 39 every two-hundred nanoseconds, etc.

Figure 5:
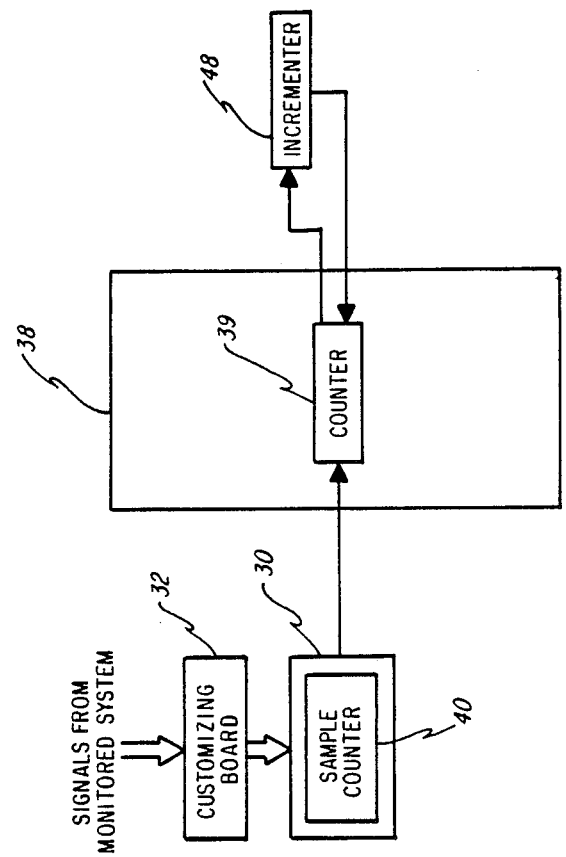

FIG. 5 is a simplified illustration of the operation of the system activity monitor 10 in the histogram mode. Signals from the monitored system are input to the event network 30 via the customizing network 32. These signals represent the first, second, third, and fourth group of signals discussed above. The contents of the sample counter 40 is modified by the third and fourth group of signals, and when an event signal is generated the counter 39 identified by the contents of the sample counter 40 is incremented by the incrementer 48. The contents of the sample counter 40 is then reset to zero and the process repeats itself.

Incrementation of the contents of the counters 39 in the profile and histogram modes is accomplished using the incrementer 48. The incrementer 48 can also zero the contents of any counter 39. When it is necessary to increment the value in a counter 39 a read/modify/write cycle occurs that takes the current value from the appropriate counter 39, loads that value into the incrementer 48, increments the value, and writes the result back to the counter 39.

Returning to the previous example wherein a histogram of bus usage for an identified processor is generated, the height of the first bar in the histogram represents the number of transactions for the identified processor that lasts less than one bus clock cycle, the height of the second bar in the histogram represents the number of bus transactions for the identified processor lasting less than two clock cycles, etc. To analyze the resulting histogram it is desirable to collect statistics of this behavior in real time. The most widely used statistic is the mean, or average, of the durations. It is known by those skilled in the art that this statistic can be easily acquired by simply counting the number of actions in the sum of the time of all the actions. The mean may then be derived from the ratio of the latter value to the former value. Another statistic of significance is the variance, $\sigma^2$, that provides a metric of variability of the actions within the sequence. To calculate the variance it is first necessary to calculate $\Sigma x^2$, where x is the height of each bar in the histogram. The microprocessor 50 then uses $\Sigma x^2$ to calculate the variance. A variance calculator 46 illustrated in FIG. 2 calculates the value of $\Sigma x^2$ as explained below.

Let $x_i$ be the interval or duration of the ith action measured. The value is measured in increments determined by the fixed frequency clock signal. For the sake of discussion, it is assumed that each action immediately follows the preceding one. Also, let n be the number of actions measured during the experiment. Then, an estimate of the mean, $m_x$, is:

$$m_x = (1/n) \sum_{i=1}^{n} x_i$$

and an estimate of the variance, $\sigma^2$, is:

$$\sigma^2 = (1/n) \sum_{i=1}^{n} x_i^2 - (1/n^2) \left( \sum_{i=1}^{n} x_i \right)^2$$

Deriving n requires only a counter to count the number of actions, which are delineated by a begin new interval signal or in this embodiment, an event signal. Similarly, calculation of $$\sum_{i=1}^{n} x_i$$

requires only a counter to measure the duration of the experiment, which is equal to the sum of the durations of the individual actions. This counter is incremented on every cycle of the clock signal.

The difficulty is in deriving the statistic $$\sum_{i=1}^{n} x_i^2$$

and, in particular, calculating $X_i^2$ for each i when the action occurs. The key concept that permits this to be done easily and is the core of the invention is based on the quadratic equation:

$$(x+1)^2 = x^2 + 2x + 1$$

where x is the accumulating value of the action's duration being derived by counting clock cycles. The implication of this relation is that the value of $x^2$ can also be accumulated. In essence it indicates that at time t, the value of $x^2$ is:

$$x^2(t) = x^2(t-1) + 2x(t-1) + 1$$

That is, the new $x^2$ is equal to the old $x^2$ plus two times the old x plus one. This simple calculation is performed ever cycle of the clock signal. At the conclusion of the action, the required value, $x^2$, has been produced. The only multiplication operation for the calculation is by the constant two. But this is simply computed by a logical left shift of the binary value. Thus, no actual multiplication hardware is required to produce $$\sum_{i=1}^{n} x^2$$

and it can be performed in real time during the sequence of actions comprising the experiment.

Figure 6:
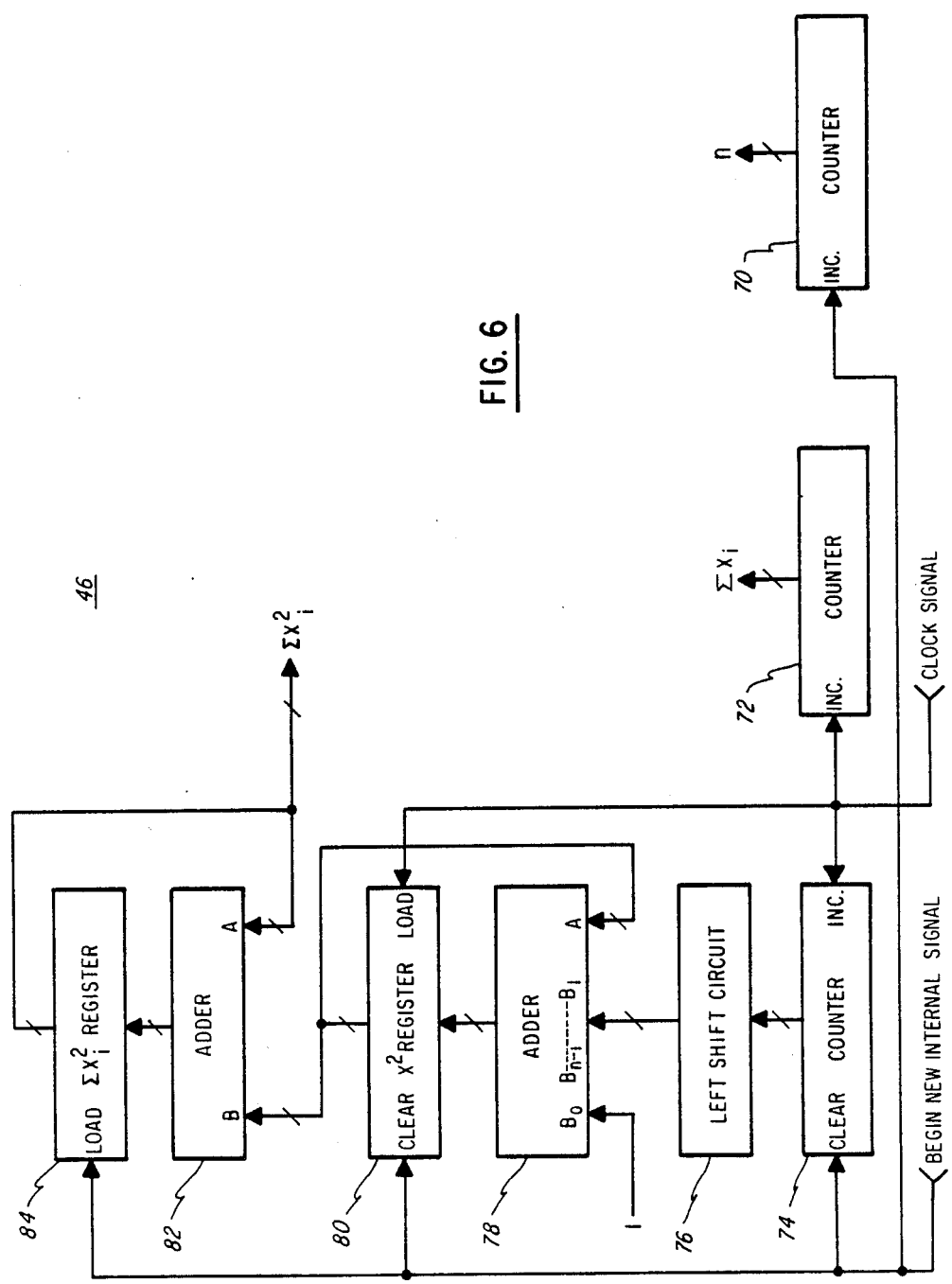
FIG. 6 is block diagram of variance calculating technique of the present invention.

A block diagram of an implementation of this method is shown in FIG. 6. Three parameters need to be computed in real time;

$$n, \sum_{i=1}^{n} x_i, \text{ and } \sum_{i=1}^{n} x_i^2.$$

two input signals are required for the primary operation. These are the clock signal for timing the durations of each action, and the begin new interval signal for counting the number of actions conducted during the course of the experiment. For simplicity, auxiliary logic for restarting the experiment and initializing registers at the beginning of the experiment is not shown; this logic is well-known in the art.

The parameter n is derived by a counter 70. The counter 70 is cleared at the beginning of the experiment and is incremented on the leading edge of the begin new interval signal. At the conclusion of the experiment the counter 70 shows the total number of actions conducted during the experiment. The parameter $$\sum_{i=1}^{n} x_i$$

is computed by a counter 72. Counter 72 is cleared a the beginning of the experiment and incremented on the leading edge of the clock signal. The counter 72 shows the total time of the experiment at its conclusion, i.e., $$\sum_{i=1}^{n} x_i.$$

The mean can then be calculated from $$m_x = (1/n) \sum_{i=1}^{n} x_i.$$

The remaining logic in FIG. 6 is dedicated to computing the parameter $$\sum_{i=1}^{n} x_i^2.$$

A counter 74 measures the length of each action's duration. At the beginning of an action, the begin new interval signal clears the counter 74. Then for each cycle of the clock signal, the counter 74 is incremented by one. During the action an $x^2$ register 80 accumulates the partial results leading to the final value of $x^2$ at the end of the action. The contents of the $x^2$ register 80 are cleared at the beginning of every action by the begin new interval signal and updated every cycle of the clock signal.

The counter 74 holds the current value of x for each cycle. The output signal from the counter 74 is applied to the B input terminal of an adder 78, via a left shift circuit 78, such that the input of value from the counter 74 is left shifted by one bit to effect a multiplication by two. This shifting operation is represented by the left shift circuit 78 but does not necessarily represent any logic, only the needed wiring convention. The least significant bit of the B input terminal to the adder 78 is forced to a logical one to achieve the "plus one" part of the equation. The other input to the adder 78 is the output of the $x^2$ register 80, which is the previous value of $x^2$, for example $x^2$ at (t−1). Thus each clock signal cycle updates the contents of the $x^2$ register 80 so that the $x^2$ register 80 contains the square of the number of clock cycles occurring since the last begin new interval signal.

Upon receipt of the begin new interval signal that marks the end of the last action and the beginning of the new one, the value of the $x^2$ register 80 is added to the contents of a $\Sigma x^2$ register 82 by an adder 82. The contents of both the $x^2$ register 80 and the counter 74 are reset to zero. At the conclusion of the experiment, the output of the $\Sigma x^2$ register 84 is the value of the $$\sum_{i=1}^{n} x_i^2$$

parameter for the experiment.

Returning to FIG. 1, as can be appreciated by those skilled in the art, the controller 16 communicates with the data acquisition modules 12 using any of the well-known communication schemes. For example, it is possible for the controller 16 to visit each data acquisition module 12 on a regular basis and upload the data from each of the counters 39. It is also possible to develop a scheme in which the controller 16 reads data only from those accumulators that have changed significantly since the last upload. The controller 16 also drives the display 18.

While we have shown and described several embodiments in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are obvious to one of ordinary skill in the art.

What is claimed is:

1. A system activity monitor for monitoring signals of an electronic apparatus, comprising:
   a first plurality of registers for storing information;
   means for storing a predetermined signal pattern;
   first means responsive to a first plurality of signals from the electronic apparatus for producing an event signal when said first plurality of signals match said predetermined pattern;

second means responsive to a second plurality of signals from the electronic apparatus for identifying one register of said first plurality of registers in response to the states of said second plurality of signals; and third means responsive to said event signals for storing information relative to the operation of the electronic apparatus in said identified storage register when said event signal is present.

2. The system activity monitor of claim 1 wherein the means for modifying the contents of the identified storage register increments the contents of the identified storage register.

3. The system activity monitor of claim 1 including means for displaying the contents of the first plurality of storage registers while the electronic apparatus is operating.

4. The system activity monitor of claim 1 wherein the predetermined pattern includes both present and past values for the first plurality of signals.

5. The system activity monitor of claim 1 wherein the second means include storage means for storing an address, wherein said address is for identifying one register of said first plurality of registers, and wherein in response to said second plurality of signals a new address value is loaded into said storage means.

6. The system activity of claim 5 including means responsive to a fourth plurality of signals from the electronic apparatus for producing an inhibit signal input to the second means for inhibiting the loading of a new address value into the storage means, notwithstanding the states of the second plurality of signals.

7. The system activity monitor of claim 1 wherein the second means include storage means for storing an address, wherein said address is for identifying one register of said first plurality of registers, and wherein, in response to said second plurality of signals, said address is incremented.

8. The system activity monitor of claim 7 including means responsive to a fourth plurality of signals from the electronic apparatus for producing an inhibit signal input to the second means for inhibiting the incrementation of the address, notwithstanding the states of the second plurality of signals.

9. The system activity monitor of claim 1 including a second plurality of registers for storing a plurality of predetermined patterns and including fourth means responsive to a third plurality of signals from the electronic apparatus for producing a modification signal in response thereto, and including a sample counter for storing an address, wherein said sample counter is responsive to said modification signal for changing said address, and wherein said address is for identifying one of said predetermined patterns for use by the means for producing the event signal.

10. The system activity monitor of claim 9 wherein the modification signals increments the address in the sample counter.

11. The system activity monitor of claim 9 wherein the modification signal loads a new address into the sample counter.

12. A method for monitoring the activity of an electronic apparatus including the steps of:

storing a predetermined signal pattern;

producing an event signal when a first plurality of signals from the electronic apparatus matches said predetermined signal pattern;

identifying one of said plurality of registers, in response to a second plurality of signals from the electronic apparatus, wherein each one of said plurality of registers stored information;

and storing information relative to the operation of the electronic apparatus in said identified storage register when said event signal is produced.

13. For events of variable duration occurring in an electronic apparatus, wherein the duration of each event is measured by the number of fixed-length intervals occurring during each event, said apparatus comprising;

means responsive to at least one signal from the electronic apparatus for producing an event signal defining the beginning and the end of each event;

first register means for storing the duration squared;

means for producing a delineation signal to delineate each fixed-length interval;

first count means responsive to said delineation signal for counting the number of fixed-length intervals during each event;

means for multiplying said count by two;

first adder means for adding one to said multiplied count to produce a first sum;

second adder means for adding said first sum and said duration squared from said first register means to produce a second sum, and for storing said second sum in said first register means at the beginning of each fixed-length interval;

wherein when the event has ended, the contents of said first register means is the square of the number of fixed length intervals in the event 14. The apparatus of claim 13 wherein the apparatus calculates the duration squared for a plurality of events, and wherein the apparatus includes a second register means wherein at the end of each event the values stored in the first register means are input to said second register means, and wherein the apparatus includes a second adder means for summing the contents of the first register means and the contents of said second register means, wherein the sum is stored in said register means at the beginning of each event.

15. The apparatus of claim 14 including a second counter means for counting the number of event, and calculating means for calculating the variance of the duration squared values stored in the second register means, from $$\sigma^2 = \frac{1}{n} \sum_{i=1}^{n} x_i^2$$

wherein $\sigma^2$ is the variance, n is the number of events counted by said second counter means, $X_i$ is the duration of the ith event and $$\sum_{i=1}^{n} x_i^2$$

is the sum of the durations squared stored in the second register means.

* * * * *